United States Patent
Lee et al.

(10) Patent No.: US 10,736,134 B2
(45) Date of Patent: Aug. 4, 2020

(54) NCMA-BASED UPLINK COMMUNICATION METHOD AND DEVICE THEREFOR

(71) Applicant: LG ELECTRONICS INC., Seoul (KR)

(72) Inventors: Hojae Lee, Seoul (KR); Sangrim Lee, Seoul (KR); Dongkyu Kim, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/095,113

(22) PCT Filed: Apr. 12, 2017

(86) PCT No.: PCT/KR2017/003938
§ 371 (c)(1),
(2) Date: Oct. 19, 2018

(87) PCT Pub. No.: WO2017/183845
PCT Pub. Date: Oct. 26, 2017

(65) Prior Publication Data
US 2019/0124681 A1    Apr. 25, 2019

Related U.S. Application Data

(60) Provisional application No. 62/324,870, filed on Apr. 19, 2016.

(51) Int. Cl.
*H04L 12/28*    (2006.01)
*H04W 72/14*   (2009.01)
(Continued)

(52) U.S. Cl.
CPC .......... *H04W 72/14* (2013.01); *H04B 7/0456* (2013.01); *H04L 1/00* (2013.01);
(Continued)

(58) Field of Classification Search
None
See application file for complete search history.

(56) References Cited

U.S. PATENT DOCUMENTS

2010/0098012 A1   4/2010   Bala et al.
2012/0027125 A1*  2/2012   Zhou .................. H04L 1/0025
                                                    375/297

(Continued)

OTHER PUBLICATIONS

International Search Report and Written Opinion in International Application No. PCT/KR2017/003938, dated Jul. 4, 2017, 18 pages.

*Primary Examiner* — Elisabeth Benoit Magloire
(74) *Attorney, Agent, or Firm* — Fish & Richardson P.C.

(57) ABSTRACT

Techniques for a user equipment to perform uplink communication in a wireless communication system. The user equipment performs operations that include: receiving configuration information for a codebook set related with a modulation scheme; receiving a UL grant including a specific codeword index; selecting a codebook based on the specific codeword index included in the codebook set; and transmitting data based on the selected codebook, wherein the codebook set includes a plurality of codebooks predefined for non-orthogonal coded multiple access (NCMA) scheme based communication, and wherein the codebook set is configured based on a spreading factor or an overloading factor.

12 Claims, 7 Drawing Sheets

(51) Int. Cl.
  *H04L 1/00*      (2006.01)
  *H04L 1/18*      (2006.01)
  *H04B 7/0456*    (2017.01)
  *H04L 27/26*     (2006.01)
  *H04L 5/00*      (2006.01)

(52) U.S. Cl.
  CPC .......... *H04L 1/0003* (2013.01); *H04L 1/0031* (2013.01); *H04L 1/1893* (2013.01); *H04L 5/0021* (2013.01); *H04L 27/2628* (2013.01); *H04L 27/2634* (2013.01)

(56) References Cited

U.S. PATENT DOCUMENTS

| | | | |
|---|---|---|---|
| 2012/0250742 | A1  | 10/2012 | Tiirola et al. |
| 2013/0089159 | A1* | 4/2013  | Liu ................. H04B 7/024 375/267 |
| 2014/0140360 | A1* | 5/2014  | Nikopour ............ H04B 1/707 370/479 |
| 2014/0161067 | A1  | 6/2014  | Lee et al. |
| 2014/0254544 | A1* | 9/2014  | Kar Kin Au ......... H04L 1/0038 370/330 |
| 2015/0043540 | A1  | 2/2015  | Nikopour et al. |
| 2015/0103723 | A1* | 4/2015  | Kim .................. H04W 4/06 370/312 |
| 2015/0131531 | A1  | 5/2015  | Yuan et al. |
| 2016/0150544 | A1* | 5/2016  | Nikopour ........... H04B 17/336 370/329 |
| 2016/0219627 | A1* | 7/2016  | Au .................... H04W 72/04 |
| 2017/0034845 | A1* | 2/2017  | Liu ................... H04L 1/0003 |
| 2017/0230138 | A1* | 8/2017  | Xiong ................ H04L 1/0003 |
| 2018/0206250 | A1* | 7/2018  | Lee ................... H04W 72/121 |

* cited by examiner

NCMA-BASED UPLINK COMMUNICATION METHOD AND DEVICE THEREFOR

CROSS-REFERENCE TO RELATED APPLICATIONS

This application is a National Stage application under 35 U.S.C. § 371 of International Application No. PCT/KR2017/003938, filed on Apr. 12, 2017, which claims the benefit of Application Ser. No. 62/324,870, filed on Apr. 19, 2016. The disclosures of the prior applications are incorporated by reference in their entirety.

TECHNICAL FIELD

The present invention relates to wireless communication, and more particularly, to an NCMA based uplink communication method and a device therefor.

BACKGROUND ART

A 3GPP LTE (3rd Generation Partnership Project Long Term Evolution) system has been designed in a frame structure having a transmission time interval (TTI) of 1 ms, and its data request latency time for a video application is 10 ms. However, the future 5G technology requires data transmission of lower latency due to the advent of a new application such as real-time control and tactile internet, and it is expected that 5G data request latency will be lowered to reach 1 ms. Also, the future 5G technology requires more massive UE connectivity for one base station, and it is expected that 5G requirement connectivity will be increased to maximum 1,000,000/km2.

DISCLOSURE

Technical Problem

An object of the present invention is to provide a method performing uplink communication in a user equipment (UE) in a wireless communication system.

Another object of the present invention is to provide a UE for performing uplink communication in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve one object of the present invention, a method for performing uplink communication in a user equipment (UE) in a wireless communication system comprises performing communication using a codebook corresponding to a selected modulation scheme, wherein the codebook is a codebook defined for non-orthogonal coded multiple access (NCMA) scheme based communication.

The method may further comprise receiving control information indicating a specific codeword index for the UE in the codebook from a base station, wherein the performing communication includes performing resource mapping after applying a codeword corresponding to the specific codeword index to encoded bits. The step of performing communication may further include performing IFFT after the performing resource mapping; and transmitting a signal transformed by IFFT.

The control information may include the selected modulation scheme or selected MCS (modulation and coding scheme) index. The control information may include a codebook index corresponding to the codebook. The codebook may correspond to a specific codebook among a codebook set defined for the NCMA scheme based communication. The codebook may be a codebook defined considering a symbol size. The modulation scheme may include a modulation order. The control information may be an uplink grant for uplink scheduling, and the NCMA based communication scheme may be a non-contention based communication scheme.

To achieve another object of the present invention, a user equipment (UE) for performing uplink communication in a wireless communication system comprises a processor configured to perform communication using a codebook corresponding to a selected modulation scheme, wherein the codebook may be a codebook defined for non-orthogonal coded multiple access (NCMA) scheme based communication.

The UE may further comprise a receiver configured to receive control information indicating a specific codeword index for the UE in the codebook from a base station, wherein the processor may be configured to perform resource mapping after applying a codeword corresponding to the specific codeword index to bits encoded for the communication.

The processor may be configured to perform IFFT after the performing resource mapping, and may further include a transmitter configured to transmit a signal transformed by IFFT. The control information may include the selected modulation scheme or a selected MCS (modulation and coding scheme) index. The control information may include a codebook index corresponding to the codebook. The codebook may correspond to a specific codebook among a codebook set defined for the NCMA scheme based communication.

Advantageous Effects

In accordance with one embodiment of the present invention, signals for multiple users may efficiently be transmitted by superposition using a UE-specific codebook and codeword in an NCMA based communication environment, whereby communication system throughput may be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Specific terms used in the embodiments of the present invention are provided to assist understanding of the present invention, and all terms used herein including technical or scientific terms have the same meaning as those generally understood by the person with ordinary skill in the art to which the present invention pertains. Various modifications may be made in the specific terms within the range that they do not depart from technical spirits of the present invention.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Figure 1:
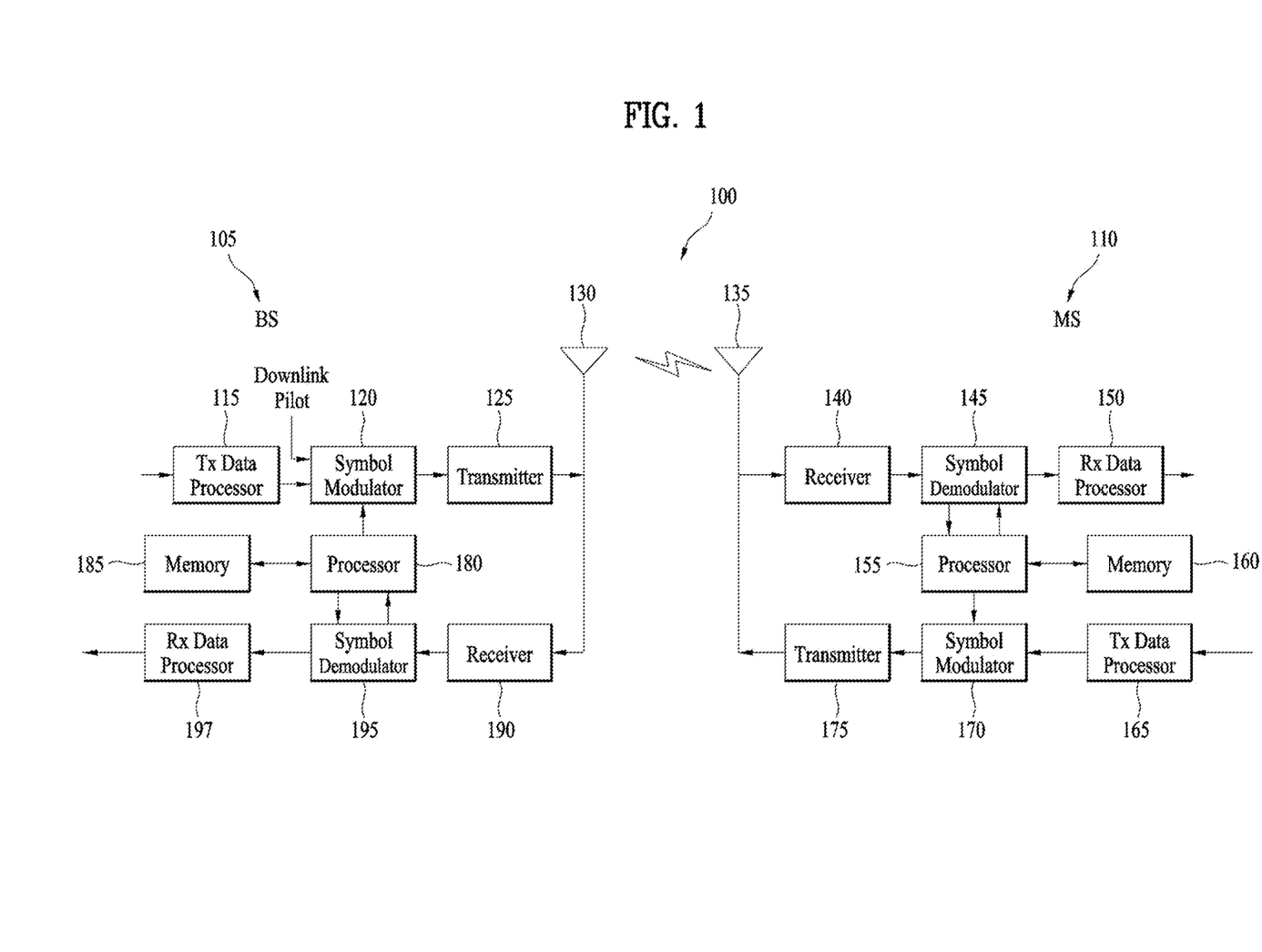
FIG. 1 is a block diagram illustrating a configuration of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention suggests a method for controlling uplink multi-UE interference of a Non-orthogonal Coded Multiple Access (NCMA) system among systems for superposition transmission of signals for multiple users to the same time-frequency resource.

A Non-orthogonal Coded Multiple Access (NCMA) system is one of schemes for superposition transmission of multi-UE data to the same time-frequency resource, and may be categorized into a Non-orthogonal Multiple Access (NOMA) system. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the NOMA system, a transmitting end varies power allocation of each symbol after modulation of multi-UE data or transmits the multi-UE data by hierarchically modulating the multi-UE data based on hierarchical modulation and applying sparsity to the frequency resource, and the receiving end demodulates the multi-UE data through multiuser detection (MUD).

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or the number of repeated demodulation attempts. Since the NOMA based systems transmit multiuser signals to the same time-frequency resource through superposition, the systems have a higher decoding error rate as compared with the LTE system but may support higher frequency usage efficiency or more massive connectivity. The NOMA systems may support higher frequency usage efficiency or more massive connectivity. The NOMA systems may achieve higher frequency usage efficiency or more massive connectivity while maintaining a decoding error through coding rate control in accordance with a system environment.

Figure 2:
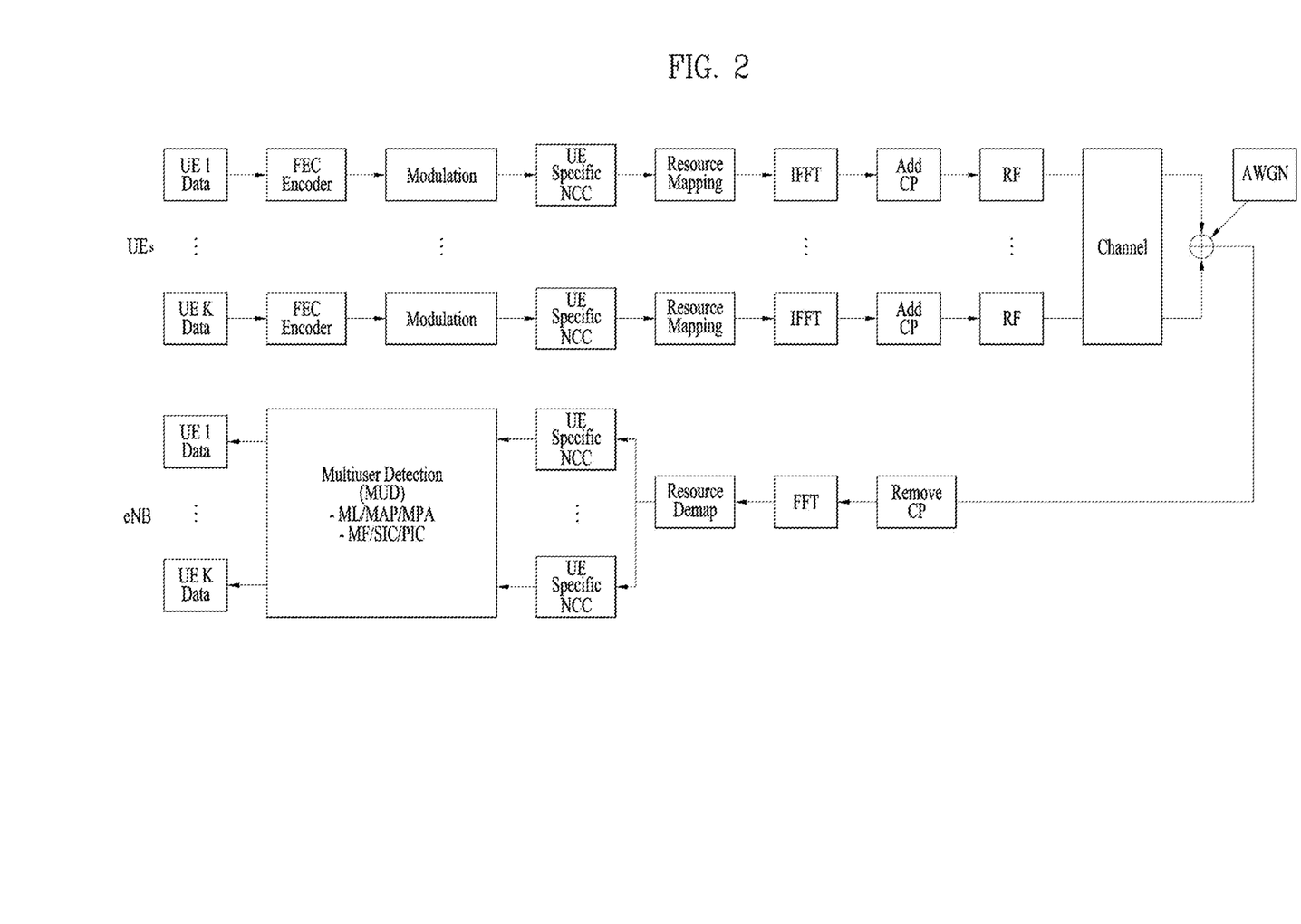
FIG. 2 is an exemplary block diagram illustrating NCMA based uplink transmission/reception (Tx/Rx) of a communication apparatus.

FIG. 2 is an exemplary block diagram illustrating NCMA based uplink transmission/reception (Tx/Rx) of a communication apparatus.

The NCMA system quantifies multiuser interference by applying a code that minimizes multi-UE interference to a frequency resource. FIG. 2 illustrates uplink transmitting end/receiving end (or transmitting side/receiving side) structures of the NCMA system that performs superposition transmission by using UE specific non-orthogonal code cover (NCC) when multi-UE information is allocated to the same time-frequency resource. The transmitting end/receiving end allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 1.

$$C = [c^{(1)} \ \ldots \ c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 1]}$$

In the above Equation 1, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiving end.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $$\min_C (\max_{1 \leq k < j \leq K} \sqrt{1 - |c^{(k)*} \cdot c^{(j)}|^2}), \ C \subset \mathbb{C}^{N \times K}$$

The UE-specific NCC has features as expressed by the following Equation 2.

$$\begin{cases} |c^{(k)*} \cdot c^{(k)}| = 1, \ \forall k, k = 1, \ldots, K, \\ \text{if } N > K, |c^{(k)*} \cdot c^{(j)}| = \delta, \ \forall k, \forall j, k = 1, \ldots, K, j = 1, \ldots, K, \\ \text{if } N \leq K, |c^{(k)*} \cdot c^{(j)}| = 0, \ \forall k, \forall j, k = 1, \ldots, K, j = 1, \ldots, K. \end{cases} \quad \text{[Equation 2]}$$

In this case, $c^{(k)*}$ is a conjugate codeword of $c^{(k)}$. The features of the Equation 2 are as listed in the followings (1), (2), and (3).

(1) Multiplication of the same codewords in the transmitting end and receiving end is 1.

(2) The chordal distance between a codeword and another codeword in the same codebook is equally maintained.

(3) If N≤K, a codeword is orthogonal to another codeword.

The codebook having the above features is previously scheduled by the transmitting end/receiving end (or transmitting side/receiving side) to configure UE-specific NCC. In this case, a lower bound of a chordal distance $$\delta_{N,K} \geq \sqrt{1 - \frac{(N-1)K}{N(K-1)}}.$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiving end may be predicted by MUI value, MCS level may be controlled based on interference for multi-UE superimposition transmission. For example, when K codewords are transmitted in (N×1) dimension, if the receiving end performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on values of N and K, the number K of superposition UEs or the number N of used resources may be varied depending on Required SINR or target QoS of the communication system, whereby the MUI value may be controlled.

Figure 3:
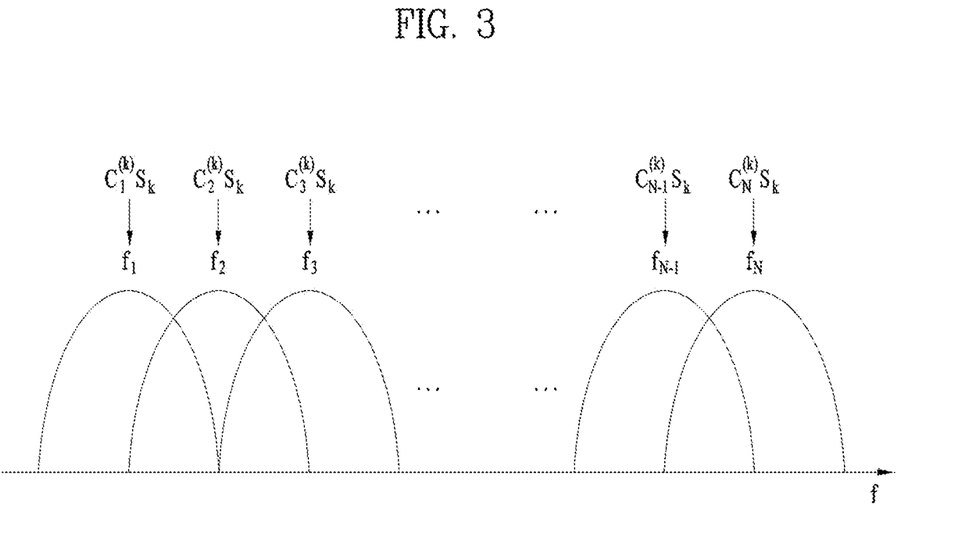
FIG. 3 is a conceptual diagram illustrating a frequency axis of data transmission based on UE-specific NCC.

FIG. 3 is a conceptual diagram illustrating a frequency axis of data transmission based on UE-specific NCC.

FIG. 3 illustrates a concept that a transmitting end transmits kth UE data on a frequency axis through UE-specific NCC. When UE-specific NCC defined by Grassmaniann line packing is previously scheduled by the transmitting end and the receiving end, data for the kth UE is multiplied by a codeword corresponding to the kth UE. At this time, one data symbol $s_k$ corresponds to a codeword vector $c^{(k)}$ of (N×1) dimension. Then, N elements of the codeword corresponds to N subcarriers.

That is, in FIG. 3, since one data symbol is transmitted on N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 4:
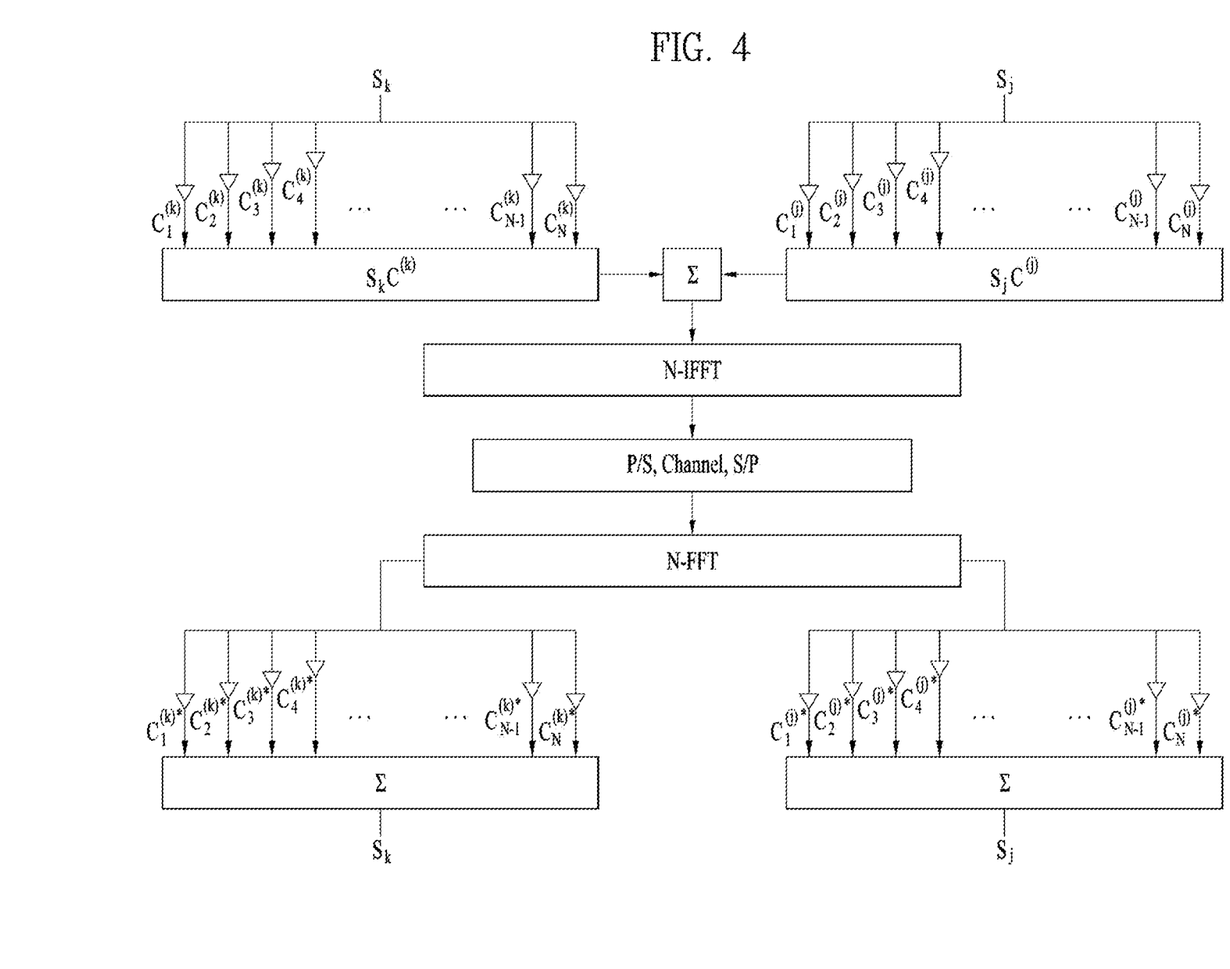
FIG. 4 is a structural diagram illustrating basic transmission and reception of an NCMA system.

FIG. 4 is a structural diagram illustrating basic transmission and reception of NCMA system.

FIG. 4 is a basic transmission and reception structural view of NCMA system that uses UE-specific NCC. Data symbols for each UE are converted to UE-specific NCC corresponding to each UE and superposed in the transmitting end. A frequency axis signal of a superposed N length is converted to a time-axis signal through N-IFFT, whereby OFDM transmission is performed, and the receiving end restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiving end even in case of N-FFT.

In another NoMA system, a NoMA system for spreading bits encoded based on modulation and non-orthogonal codebook into complex symbol vectors may be considered. This system is a multi-dimensional modulation based NoMA system, and sparsity may exist or not. An operation of this system will be described below.

Figure 5:
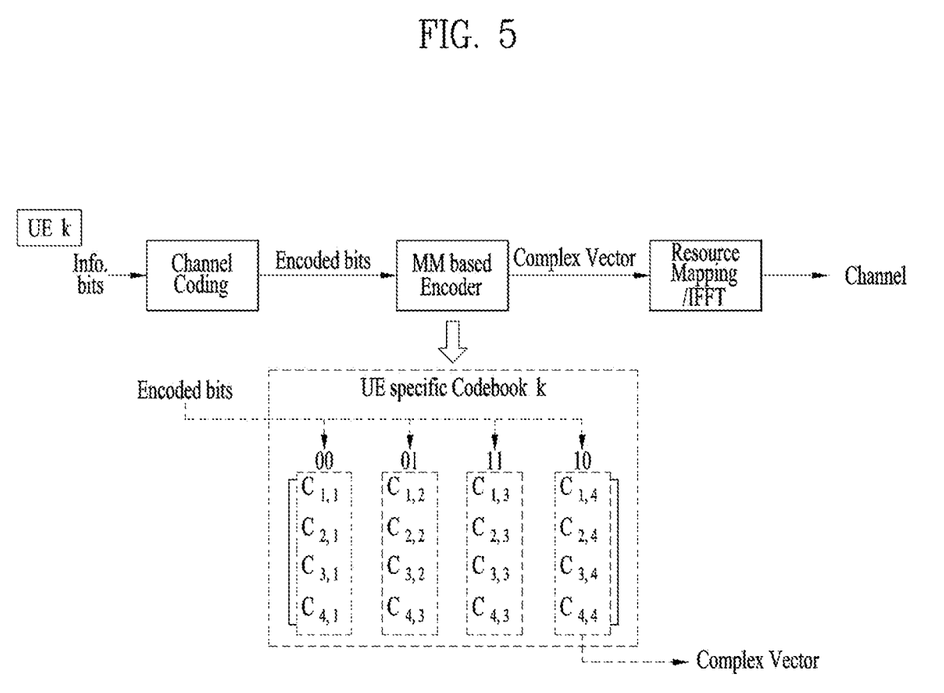
FIG. 5 is an exemplary diagram illustrating an operation of Multi-dimensional Modulation based NoMA system of a UE.

FIG. 5 is an exemplary diagram illustrating an operation of Multi-dimensional Modulation based NoMA system of a UE.

In the example of FIG. 5, a kth UE (UE k) which performs uplink communication generates information bit streams according to traffic which is generated, and performs channel coding for the generated information bit streams and converts the channel coded data to encoded bit streams. Afterwards, a UE specific codebook k may be applied to the encoded bits encoded by the Multi-dimensional Modulation (MM) based encoder, whereby the encoded bits may be converted to a complex vector. In FIG. 5, for example, corresponding UE-specific codewords may respectively be applied to the encoded bits of 2 bits([00], [01], [10], [11]), whereby the encoded bits may be converted to a complex vector that includes four complex symbols.

For example, if the encoded bits correspond to [00], the corresponding codeword is applied to the encoded bits and thus converted to the complex vector $[c_{1,1}, c_{2,1}, c_{3,1}, c_{4,1}]^T$. The converted complex vector is transmitted by being subjected to IFFT through resource mapping. This operation is similarly applied to a downlink operation, and the complex vector is decoded to encoded bits through Message Passing Algorithm (MPA) at a receiving end. The above system is operated by combination of modulation and the NoMA encoder, a codebook is configured in accordance with modulation.

In the NCMA system, since a plurality of UE data are allocated to the same resource, interference on data of multiple UEs necessarily occurs as compared with allocation of single UE data. In the NCMA system of FIG. 2, a received signal of the receiving end is expressed as follows.

$$y = \sum_{n=1}^{K} H_n c^{(n)} s_n + n = H_k c^{(k)} s_k + \sum_{n \neq k, n=1}^{K} H_n c^{(n)} s_n + n, \quad \text{[Equation 3]}$$

In this case, $H_k$ means (N×N) channel matrix from the kth transmitting end to the receiving end, and includes frequency-axis channel coefficients as a diagonal matrix. $c^{(k)}$ is (N×1) UE-specific NCC vector for the receiving end at the kth transmitting end, $s_k$ is a data symbol to the kth receiving end, and n means (N×1) signal noise vector. K is the number of multi-UEs allocated to the same time-frequency resource.

In the above Equation 3, the second item of the third formula indicates multi-UE interference signal MUI based on data symbol to another receiving end. A detection equation for data decoding of the kth UE in the receiving end is expressed as illustrated in the following Equation 4.

$$\hat{y}_k = \left[ \frac{[y]_j}{[H_k]_{j,j}} \right]_{j=1,\ldots,N} c^{(k)} s_k + \sum_{n=1}^{K} \left[ \frac{[H_n]_{j,j}}{[H_k]_{j,j}} \right]_{j=1,\ldots,N} c^{(n)} s_n + \hat{n}, \quad \text{[Equation 4]}$$

In this case, $$\left[ \frac{[A]_j}{[B]_{j,j}} \right]_{j=1,\ldots,N}$$

means division of the jth element of vector A and the jth diagonal element of matrix B. If the vector A is a diagonal matrix, the vector A means element division of diagonal matrixes. A signal of desired codewords, MUI and noise remain through channel compensation for the kth UE data, and are detected as expressed by the following Equation 5 through conjugate codeword of UE-specific NCC of the receiving end.

$$\tilde{y}_k = c^{(k)*} \cdot \hat{y}_k = c^{(k)*} \cdot c^{(k)} s_k + \quad \text{[Equation 5]}$$

$$\sum_{n \neq k, n=1}^{K} c^{(k)*} \cdot \left[ \frac{[H_n]_{j,j}}{[H_k]_{j,j}} \right]_{j=1,\ldots,N} c^{(n)} s_n + \tilde{n},$$

$$= s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} s_n + \tilde{n}.$$

In the Equation 5, the second item of the last column indicates MUI, and may be removed or reduced through the MUD scheme.

At this time, since the receiving end transmits a plurality of user signals through superposition in case of uplink, a symbol size is constant in case of QPSK (Quadrature Phase Shift Keying) but a symbol size of the receiving end is different at all modulation series in which QAM (Quadrature Amplitude Modulation) or power difference is used. That is, for demodulation, a symbol size may be different between multiple users. Therefore, the MUI may be affected by a symbol power, and an absolute size of the MUI may be varied. Therefore, a codebook design considering a symbol power is required.

The present invention suggests a method for configuring non-orthogonal spread codewords considering a symbol power to control multi-UE interference of an NCMA system that transmits multi-user data to the same time-frequency resource in an uplink through superposition.

Non-Orthogonal Coded Multiple Access (NCMA)

In an uplink NCMA system, a codebook design scheme considering a size difference between multi-user symbols will be required.

MUI of the receiving end for data decoding of the kth UE is expressed as illustrated in the following Equation 6.

$$\sum_{n \neq k, n=1}^{K} \left| c^{(k)*} \cdot \left[ \frac{[H_n]_{j,j}}{[H_k]_{j,j}} \right]_{j=1,\ldots,N} c^{(n)} \right|^2 \quad \text{[Equation 6]}$$

In the Equation 6, a modulation scheme (or modulation order) which is used corresponds to a case that sizes of all modulated symbols are constant like BPSK (Binary Phase Shift Keying) and QPSK. However, if sizes of symbols are different like QAM, sizes of MUI superposed in the receiving end may be different, whereby the following Equation 7 should be expressed.

$$\sum_{n \neq k, n=1}^{K} \left| c^{(k)*} \cdot \left[ \frac{[H_n]_{j,j}}{[H_k]_{j,j}} \right]_{j=1,\ldots,N} c^{(n)} \right|^2 \cdot |s_n|^2 \quad \text{[Equation 7]}$$

An MUI value may be varied depending on a channel effect, a correlation value between codewords, and a symbol size.

Figure 6:
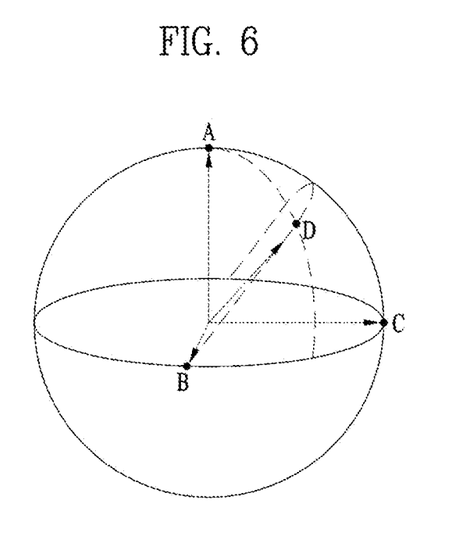
FIG. 6 is a diagram illustrating a position of a codeword on the same sphere space in a complex domain of N dimension.

FIG. 6 is a diagram illustrating a position of a codeword on the same sphere space in a complex domain of N dimension.

As described above, if the symbol size is constant in accordance with a modulation scheme, a position of a codeword in a complex domain of N dimension may be expressed as shown in FIG. 6. In this case, all the codewords may be located on a surface of the same sphere, and a position of a codeword for maximizing a chordal distance on the corresponding sphere may be determined. MUI may be minimized by maximizing a minimum value of a chordal distance between codeword pairs or minimizing a maximum value thereof. For example, in FIG. 6, codewords A, B, C and D exist on the same N dimensional sphere space at the same scaling factor. Therefore, the MUI value based on correlation between codewords is always constant.

Figure 7:
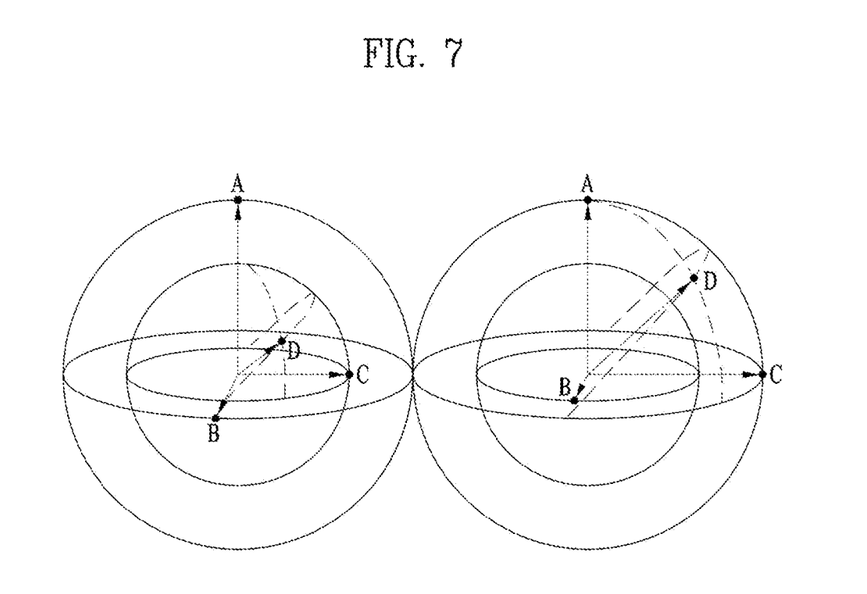
FIG. 7 is a diagram illustrating a position of a codeword on a plurality of sphere spaces according to scaling in a complex domain of N dimension.

FIG. 7 is a diagram illustrating a position of a codeword on a plurality of sphere spaces according to scaling in a complex domain of N dimension.

If there is a difference in symbol sizes in accordance with a modulation scheme, a position of a codeword on a plurality of sphere spaces may be expressed in accordance with a scaling level in a complex domain of N dimension as shown in FIG. 7. In this case, it is assumed that scaled versions of sphere spaces of a complex domain of the same N dimension coexist. Codewords of the respective spaces exist on the same complex space but their sizes may be different.

For example, at a left drawing of FIG. 7, codewords A and B and codewords C and D are located on the same sphere space, and the codewords A and C are located on their respective sphere spaces different from each other. In this case, the codewords A and C correspond to the same space in view of a complex space but have their respective sizes on the sphere space (or sphere surface) due to their respective scaling levels different from each other. Therefore, there is a difference in a distance value between the codeword pairs. In this case, the distance means a distance which is not scaled by the same sphere due to normalization. Likewise, at a right drawing of FIG. 7, codewords A, C and D are located on the same sphere space, and codeword B is located on a sphere surface subjected to scaling. In this case, a distance value between the codeword pairs may be different from a chordal distance. Therefore, an equation for optimizing MUI may be expressed as illustrated in Equation 8 below.

$$\min_{C} \left( \max_{1 \leq k < j \leq K} \sqrt{1 - |c^{(k)*} \cdot c^{(j)}|^2 \cdot |s_k|^2 \cdot |s_j|^2} \right), C \subset \mathbb{C}^{N \times K} \quad \text{[Equation 8]}$$

A different size may be applied to each symbol by the modulation scheme, and $|s_k|^2, |s_j|^2$ indicates a symbol size. Therefore, it is required to design a codebook considering the size of symbols according to the modulation scheme based on the Equation 8. That is, a codebook design may be different depending on the modulation scheme (or modulation order). This may be applied to the spreading based NoMA system, and for example, may be applied to the NoMA system to which MM based Encoder is applied.

As described above, the UE may use different codebooks depending on the modulation scheme, or may use non-orthogonal spread codeword dedicated or indicated for the UE at the corresponding codebook. In this way, a codebook corresponding to each modulation scheme (or modulation order) may be designed, and a set of codebooks corresponding to each modulation scheme may be configured. Information on the set of codebooks may be shared between the UE and the base station in the form of a look up table. As an example, the look up table is listed in Table 1 below. The base station may define the number of codewords in codebook, Spreading Factor, and overloading factor per modulation order as follows.

TABLE 1

| Modulation Order | Codebook | number (#) of Codewords in Codebook | Spreading Factor | Overloading Factor |
|---|---|---|---|---|
| BPSK | Codebook 1 | 6 | 2 | 300% |
| QPSK | Codebook 1 | 4 | 2 | 200% |
| 16QAM | Codebook 2 | 6 | 4 | 150% |
| 64QAM | Codebook 3 | 12 | 8 | 150% |
| 256QAM | Codebook 3 | 10 | 8 | 125% |
| ... | ... | ... | ... | ... |

As illustrated in Table 1, different codebooks (spreading codebooks) may be used depending on the modulation order. For example, if the modulation order is 16QAM, the UE may select and use Codebook 2, which is a codebook corresponding to 16QAM, from the sets of codebooks.

In the NoMA system, the spreading codebook retains three features as follows.

1. The more the number of codewords supported by the spreading codebook is, the more increased the amount of MUI is.

2. The smaller the spreading factor used by the spreading codebook is, the more increased the amount of MUI is.

3. The greater the overloading factor of the spreading codebook is, the more increased the amount of MUI is.

Therefore, the following schemes may be applied.

Since decoding performance is varied depending on the modulation order, the number of codewords supported by the spreading codebook may be varied. Generally, the lower the modulation order is, the more the number of codewords may be, whereas the higher the modulation order is, the less the number of codewords may be.

Since decoding performance is varied depending on the modulation order, the spreading factor used by the spreading codebook may be varied. Generally, the lower the modulation order is, the smaller the spreading factor may be, whereas the higher the modulation order is, the greater the spreading factor may be.

Since decoding performance is varied depending on the modulation order, the overloading factor (that is, the number of codewords in the codebook/the spreading factor of the codebook) of the spreading codebook may be varied. Generally, the lower the modulation order is, the greater the overloading factor may be, whereas the higher the modulation order is, the smaller the overloading factor may be.

As described above, although the codebook design will be described based on that MUI of a correlation between codewords is constant, the codebook design may include a system that configures a codebook differently depending on the modulation order even though there is a difference in the correlation between codewords.

Also, the UE may use different codebooks in accordance with an MCS level (or MCS index). The UE may use a corresponding non-orthogonal spreading codeword in the codebook corresponding to the MCS level. For example, a look up table for the MCS level and the codebook may be considered as illustrated in Table 2 below.

TABLE 2

| MCS Level | Codebook | number (#) of Codewords in Codebook | Spreading Factor | Overloading Factor |
|---|---|---|---|---|
| MCS 1 | Codebook 1 | 6 | 2 | 300% |
| MCS 2 | Codebook 1 | 4 | 2 | 200% |
| MCS 3 | Codebook 2 | 6 | 4 | 150% |
| MCS 4 | Codebook 3 | 12 | 8 | 150% |
| MCS 5 | Codebook 3 | 10 | 8 | 125% |
| . . . | . . . | . . . | . . . | . . . |

As illustrated in Table 2, different codebooks (spreading codebooks) may be used depending on the MCS level. For example, if the MCS level is 3, the UE may select and use Codebook 2, which is a codebook corresponding to MCS level 3, from the sets of codebooks. In the NoMA system described in respect of Table 1 above, three features of the spreading codebook may be applied to even the case that different spreading codebooks are used depending on the MCS level.

Referring to Table 2, the following schemes may be applied.

Since decoding performance is varied depending on the MCS level, the number of codewords supported by the spreading codebook may be varied. Generally, the number of codewords may be more at the MCS level connected to low spectral efficiency, whereas the number of codewords may be less at the MCS level connected to high spectral efficiency.

Since decoding performance is varied depending on the MCS level, the spreading factor used by the spreading codebook may be varied. Generally, the spreading factor may be small at the MCS level connected to low spectral efficiency, whereas the spreading factor may be great at the MCS level connected to high spectral efficiency.

Since decoding performance is varied depending on the MCS level, the overloading factor (that is, the number of codewords in the codebook/the spreading factor of the codebook) of the spreading codebook may be varied. Generally, the overloading factor may be great at the MCS level connected to low spectral efficiency, whereas the overloading factor may be small at the MCS level connected to high spectral efficiency.

The look up table for codebook configuration according to the modulation order or MCS level may be defined previously and shared between the UE and the base station. As an example, the base station may forward information on the look up table through RRC signaling, may be broadcasted through a common control channel, or may notify the UE of the information through DCI every time.

As the lookup table for codebook configuration according to the modulation order/MCS level, all UEs may use the same look up table, or the look up table may be used UE-specifically. The look up table may be varied by a geometry or channel environment of the UE. In this case, the base station may notify the UE of the look up table through RRC signaling or control channel such as DCI. Also, a class of the UE may be classified by the geometry or channel environment of the UE, whereby a different look up table per class may be defined previously and used. At this time, the class of the UE may be designated by the base station, and may be notified to the UE through RRC signaling or control channel such as DCI.

Through the look up table for codebook configuration according to the modulation order/MCS level, the UE may recognize a corresponding codebook based on the modulation order information or MCS level.

For convenience of description, although description will be given based on that a feature of the codebook is mapped into the modulation order or MCS level at 1:1, mapping may be performed at N:1 or 1:M. For example, a plurality of modulation orders/MCS levels may be mapped into one codebook, or one modulation order/MCS level may be connected to a plurality of codebooks. If one modulation order/MCS level is connected to a plurality of codebooks, the base station may additionally signal indication for codebook index to a user.

Figure 8:
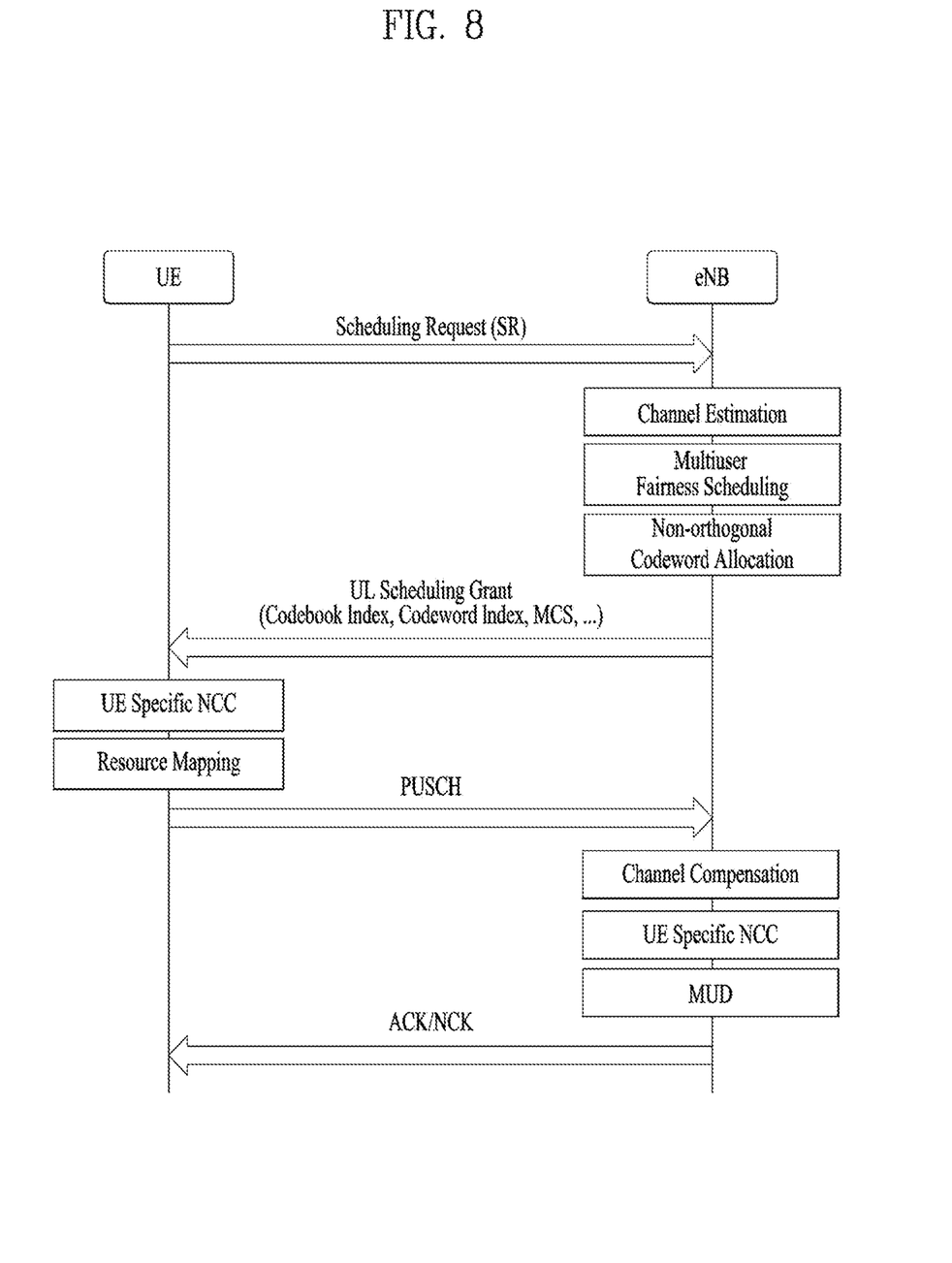
FIG. 8 is an exemplary diagram illustrating a method for exchanging information on non-orthogonal spread codebook/codeword in an uplink NCMA system.

FIG. 8 is an exemplary diagram illustrating a method for exchanging information on the non-orthogonal spread codebook/codeword in an uplink NCMA system.

Although not shown in FIG. 8, the UE may share information on predefined non-orthogonal codebooks or non-orthogonal codebook sets with the base station (eNB).

Referring to FIG. 8, in case of the uplink NCMA system, the UE may transmit a scheduling request (SR) signal to the base station request uplink information transmission. If the uplink information transmission request occurs, the base station may perform channel estimation/specific scheduling scheme (for example, multi-user fairness scheduling scheme) and then allocate the corresponding MCS index (or MCS level) or codeword index to the UE based on the channel estimation/specific scheduling scheme. The base station may transmit the corresponding MCS index (or MCS level) or codeword index to the UE through an uplink grant for uplink scheduling, etc.

The UE may select a codebook corresponding to the MCS index (or MCS level) received from the predefined codebook set. Alternatively, the base station may further include information on the codebook index corresponding to the selected codebook in the uplink grant and then transmit the corresponding information. The UE may apply the codeword (UE specific NCC) corresponding to the codeword index received from the selected codebook to encoded bits and then convert the codeword to a complex vector. Afterwards, the UE may transmit data by mapping the complex vector into a resource for uplink transmission and performing IFFT. At this time, the UE may transmit the data through an uplink data channel (for example, PUSCH (Physical Uplink Shared CHannel)).

The base station may perform channel compensation after receiving the data from the UE, and may perform MUD scheme based on the codebook and codeword (UE specific NCC) used by the UE to demodulate the data and detect the PUSCH of the UE.

At this time, the channel estimation or channel compensation scheme may be varied depending on the system. The Criterion Equation may be varied depending on each channel estimation or channel compensation scheme.

As described above, the present invention has suggested the codeword selection and codeword exchange scheme that may control an MUI value change between multiple users according to a frequency axis change of a multi-user channel.

Although the present invention has been described based on a downlink and an uplink of a cellular system, the present invention may be applied to all systems that use a multi-UE access scheme such as Machine Type Communication (MTC), Device-to-Device (D2D), and Vehicle-to-Everything (V2X).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for performing uplink communication in a UE is industrially applicable to various wireless communication systems such as 3GPP LTE-A and 5G communication system.

The invention claimed is:

1. A method for performing uplink communication by a user equipment (UE) operating in a wireless communication system, the method comprising:
    receiving configuration information for a codebook set related with a modulation scheme;
    receiving a UL grant comprising a specific codeword index;
    selecting a codebook based on the specific codeword index included in the codebook set and
    transmitting data based on the selected codebook,
    wherein the codebook set comprises a plurality of codebooks that are predefined for non-orthogonal coded multiple access (NCMA) based communication, and
    wherein the codebook set is configured based on a spreading factor or an overloading factor.

2. The method of claim 1, further comprising:
    performing resource mapping after applying the selected codeword to encoded bits.

3. The method of claim 2, wherein transmitting the data further includes:
    performing Inverse Fast Fourier Transform (IFFT) after performing the resource mapping; and
    transmitting a signal that is transformed by the IFFT.

4. The method of claim 1, wherein the codebook corresponds to a specific codebook in a codebook set defined for the NCMA based communication.

5. The method of claim 1, wherein the codebook is a codebook defined considering a symbol size.

6. The method of claim 1, wherein the modulation scheme includes a modulation order.

7. The method of claim 2, wherein the NCMA based communication scheme is a non-contention based communication scheme.

8. A user equipment (UE) configured to perform uplink communication in a wireless communication system, the UE comprising:
    a receiver and a transmitter;
    at least one processor; and
    at least one computer memory operably connectable to the at least one processor and storing instructions that, based on being executed by the at least one processor, perform operations comprising:
    receiving, through the receiver, configuration information for a codebook set related with a modulation scheme;
    receiving, through the receiver, a UL grant comprising a specific codeword index;
    selecting a codebook based on the specific codeword index included in the codebook set and
    transmitting, through the transmitter, data based on the selected codebook,
    wherein the codebook set comprises a plurality of codebooks that are predefined for non-orthogonal coded multiple access (NCMA) based communication, and
    wherein the codebook set is configured based on a spreading factor or an overloading factor.

9. The UE of claim 8, where the operations further comprise:
    performing resource mapping after applying the selected codeword to bits encoded for the communication.

10. The UE of claim 9, wherein the operations further comprise:
    performing Inverse Fast Fourier Transform (IFFT) after performing the resource mapping, and
    transmitting, through the transmitter, a signal that is transformed by the IFFT.

11. The UE of claim 9, wherein the codebook corresponds to a specific codebook in a codebook set defined for the NCMA based communication.

12. The UE of claim 9, wherein the modulation scheme includes a modulation order.

\* \* \* \* \*